United States Patent

Gustafsson et al.

(10) Patent No.: US 11,964,205 B2
(45) Date of Patent: Apr. 23, 2024

(54) CONTROLLING A USER INTERFACE OF A COMPUTER DEVICE

(71) Applicant: KING.COM LIMITED, St. Julians (MT)

(72) Inventors: Dennis Gustafsson, Malmo (SE); Gerardo Basurto, Malmo (SE); Walid Fayad, Malmo (SE)

(73) Assignee: KING.COM LIMITED, St. Julians (MT)

( * ) Notice: Subject to any disclaimer, the term of this patent is extended or adjusted under 35 U.S.C. 154(b) by 717 days.

(21) Appl. No.: 16/288,582

(22) Filed: Feb. 28, 2019

(65) Prior Publication Data

US 2020/0276502 A1 Sep. 3, 2020

(51) Int. Cl.
*A63F 13/53* (2014.01)
*A63F 13/2145* (2014.01)
*A63F 13/80* (2014.01)
*G06F 3/04817* (2022.01)
*G06F 3/04842* (2022.01)

(52) U.S. Cl.
CPC .......... *A63F 13/53* (2014.09); *A63F 13/2145* (2014.09); *A63F 13/80* (2014.09); *G06F 3/04817* (2013.01); *G06F 3/04842* (2013.01)

(58) Field of Classification Search
CPC ...... A63F 13/53; A63F 13/2145; A63F 13/80; G06F 3/04817; G06F 3/04842
See application file for complete search history.

(56) References Cited

U.S. PATENT DOCUMENTS

| 9,724,607 | B2* | 8/2017 | Frostberg | A63F 13/822 |
| 2014/0080559 | A1* | 3/2014 | Knutsson | A63F 13/2145 463/10 |
| 2014/0342791 | A1* | 11/2014 | Hugh | A63F 13/80 463/9 |
| 2015/0343311 | A1* | 12/2015 | Cirlig | A63F 13/537 463/31 |
| 2016/0089603 | A1* | 3/2016 | Frostberg | A63F 13/80 463/31 |
| 2019/0054380 | A1* | 2/2019 | Gustafsson | A63F 13/69 |

\* cited by examiner

*Primary Examiner* — William H McCulloch, Jr.
*Assistant Examiner* — Ankit B Doshi
(74) *Attorney, Agent, or Firm* — Saul Ewing LLP

(57) ABSTRACT

According to a first aspect of the present invention, there is provided a computer device comprising: a user interface controllable to display to a user a gameboard of multiple user selectable game elements of at least two types; and a processor configured to: generate a user activatable booster object for display on the user interface; detect a user input to activate the booster object; activate the booster object to generate a booster effect; wherein the processor is further configured, on activation of the booster object, to generate the booster effect by detecting a group of game elements in a region defined on the gameboard; and sort the game elements in the group to display game elements of a matching type adjacent one another in the region to generate a sorted configuration of game elements in the region.

17 Claims, 12 Drawing Sheets

CONTROLLING A USER INTERFACE OF A COMPUTER DEVICE

FIELD OF THE INVENTION

The present invention relates to controlling a user interface responsive to user engagement with displayed elements on the interface of a computer device.

BACKGROUND OF THE INVENTION

When creating computer devices on which computer-implemented games are executed, there are many technical challenges when considering how the game is to be effectively implemented on the device and how the user interface is to be controlled One technical challenge can involve allowing a game to be fun and compelling even when there is limited display resource available, such as when a game is being played on a smartphone, tablet or other minicomputer. Another significant challenge is that of user engagement. Engagement involves designing gameplay to be engaging and rewarding to players. This typically requires games to be easily understood at their simplest or introductory levels, providing rewarding gameplay with quite simple game mechanics, but becoming progressively more challenging so that players are not bored, but remain engaged and develop rewarding skills. Effective engagement requires various forms of feedback to reinforce player sense of success and accomplishment.

A 'clicker game' is a type of casual puzzle game where the player is required to find patterns on a seemingly chaotic board. The player then has to match two or more of the same type of game element on the game board and those matched elements will then be removed from the board. The player matches adjacent game elements of the same type by selecting one or more of the game elements in the group of matching elements. The matched elements are then removed from the gameboard.

One such known match three-type game is known by the trade name Pet Rescue Saga™. The aim of this game is to release pets from the gameboard by removing game elements underneath the pets such that they fall to the bottom of the gameboard. There may be elements on the gameboard which cannot be removed by matching, referred to as blockers. Such elements are removed from the gameboard by removing matching elements adjacent to the blockers from the gameboard. There may be scenarios in which there are no matching game elements adjacent to each other, such that no game elements can be removed from the gameboard through the match mechanic. In order to proceed with the level, the user may have access to a game element with special characteristics, known as a booster, which is able to remove game elements from the gameboard which are not situated in matching groups.

Another known type of game is "linker game", where a sequence of game elements are linked to form a known sequence, such as a word, which can be matched to a dictionary. When a known sequence is linked, game elements in the link are removed from the gameboard.

Computer devices which are configured to provide such games need to be constructed to deliver game modes in an engaging and user-friendly way.

SUMMARY OF THE INVENTION

Aspects of the present invention provide an improved computer device having a user interface which is controlled to provide a computer-implemented game of a matching type (clicker or linker). The device is configured to provide a solution to the technical problem of improved user engagement by providing a new user engagement feature, which is implemented by a processor configured by a game code with a data structure held in memory in the computer device.

According to a first aspect of the present invention, there is provided a computer device comprising: a user interface controllable to display to a user a gameboard of multiple user selectable game elements of at least two types; and a processor configured to: generate a user activatable booster object for display on the user interface; detect a user input to activate the booster object; activate the booster object to generate a booster effect; wherein the processor is further configured, on activation of the booster object, to generate the booster effect by detecting a group of game elements in a region defined on the gameboard; and sort the game elements in the group to display game elements of a matching type adjacent one another in the region to generate a sorted configuration of game elements in the region.

The gameboard may be an array of m×n game elements arranged in rows and columns, and the group of game elements is an p×q array, where p≤m, q≤n.

The processor may be configured to detect selection by the user of one of the user-selectable game elements which is adjacent at least one other user selectable game element of a matching type and to remove the selected game elements and all other user selectable adjacent game elements of the matching type.

The processor may be configured to detect if the group contains at least two game elements of a matching type and if not, inhibiting activation of the booster after detecting the user input.

The group may contain game elements of multiple types in the region, and the processor may be configured to sort all game elements of each type to be adjacent one another.

The processor may be configured to identify a largest group of game elements of a first type in the region and sort into a first location in the region, then identify a next largest number of a second type and sort into a second location.

The processor may be configured to identify a first type of which there are at least two game elements in the region and sort the at least two game elements of the first type into a first location, then identify a second type of which there are at least two game elements and sort the at least two game elements of the second type into a second location.

The processor may be configured to determine for the sorted configuration whether the sorted game elements in at least one of the first and second locations are adjacent at least one game element of the first and second type, respectively, outside the region.

The processor may be configured to generate on the user interface a visual indication of the group of game elements in the region which visually distinguishes the game elements in group from the other game elements on the gameboard.

The processor may be configured to detect a user input to move the region affected by the booster effect with respect to the gameboard, wherein the visual indication identifying the group is generated for each region affected by the booster effect as the user input is detected.

The visual indication may be at least one of: a coloured border of the region; a highlighting of the game elements in the group; a darkening of game elements in the gameboard which are not in the group; enlargement of game elements in the group; and a visual depiction of displacement of game elements in the group out of the plane of the gameboard.

The visual indication may be indicative of whether the group contains at least two game elements of a matching type.

The processor may be configured to detect the user input to activate the booster object by detecting at least one of: removal of a user touch on a touch screen of the user interface; and selection of a control on the user interface.

The processor may be configured to present a visual representation of the booster object on the user interface at at least one of: a selected location within the region of the booster effect; and a location externally of the gameboard; wherein the visual representation may be responsive to user engagement to activate the booster object.

There may be a memory holding a tile data structure comprising a plurality of element identifiers respectively identifying game elements of the game board, each element identifier indicating a location of the game elements and at least one property of the game elements selected from type and sortability.

The gameboard may comprise a plurality of tiles each supporting a respective game element and each having a tile identifier indicating its location in the gameboard, wherein the location of the booster effect may be indicated by the tile identifier of a target tile at which the booster object is located.

The processor may be configured to determine the tile identifiers of the tiles in the region, access element identifiers of the elements supported by these tiles, and determine the type of the element in order to generate at least one list of elements of a matching type in the region to enable sortable game elements of each matching type to be moved to a new tile within the region so as to generate the sorted configuration.

The non-sortable game elements may remain in place on the gameboard when the booster effect is activated.

According to a second aspect of the present invention, there is provided a method of controlling a display of a user device, the method comprising: displaying on a user interface a gameboard of multiple user-selectable game elements of at least two types; generating a user activatable booster object for display on the user interface; detecting a user input to activate the booster object; activating the booster object to generate a booster effect; wherein, on activation of the booster object, the booster effect is generated by detecting a group of game elements in a region defined on the gameboard; and sorting the game elements in the group to display game elements of a matching type adjacent one another in the region to generate a sorted configuration of game elements in the region.

According to a third aspect of the present invention, there is provided a computer program comprising computer readable instructions stored on a non-transitory computer readable media, the computer readable instructions, when executed by a processor of a computer device, causing a method of controlling a graphical user interface of the computer device to be implemented, the method comprising: displaying on a user interface a gameboard of multiple user-selectable game elements of at least two types; generating a user activatable booster object for display on the user interface; detecting a user input to activate the booster object; activating the booster object to generate a booster effect; wherein, on activation of the booster object, the booster effect is generated by detecting a group of game elements in a region defined on the gameboard; and sorting the game elements in the group to display game elements of a matching type adjacent one another in the region to generate a sorted configuration of game elements in the region.

BRIEF DESCRIPTION OF THE DRAWINGS

For a better understanding of the present invention and to show how the same may be carried into effect, reference will now be made by way of non-limiting example to the accompanying drawings, in which.

DETAILED DESCRIPTION OF THE INVENTION

Figure 1:
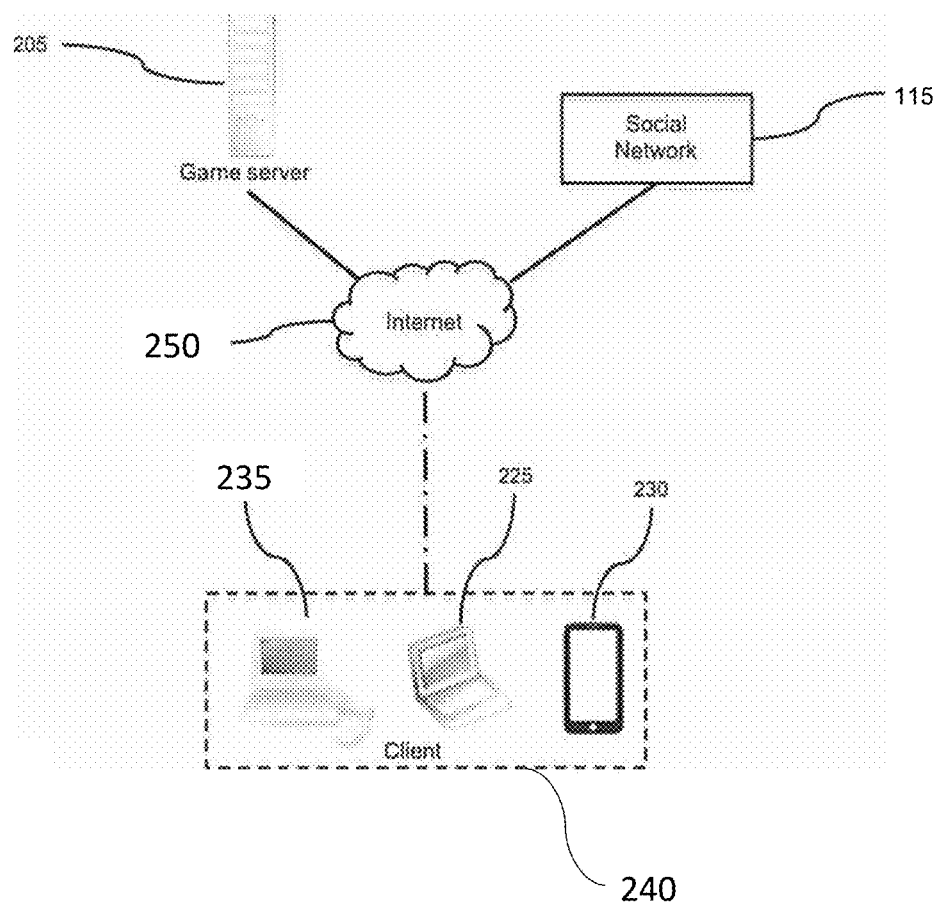
FIG. 1 is a schematic block diagram illustrating an environment for playing a game.

The embodiments of the present invention described herein provide an improved computer device configured by computer code to implement a new game feature, with improved user engagement. The game code is stored in a memory and executed by at least one processor to configure the device. An initial gameboard is delivered comprising tiles. The tiles are each associated with tile characteristics, such that some of the tiles contain user actuatable game elements, which the player may attempt to remove from the gameboard by 'clicking' on groups of elements of a matching type. According to the new user engagement feature, the user may activate a special game element, referred to a sorting booster, on the gameboard which has the effect of sorting the game elements in a predefined region (or area) of the gameboard into groups of matching elements.

The new sorting booster described herein allows the user to choose an area of the gameboard in which the game elements are sorted. He may choose to activate the booster in an area where there are blocking elements and no nearby matching game elements, for example, such that he can more easily remove the blocking elements. The user may choose to sort the game elements in an area which will result in the generation of more booster elements or boosters in a desired location. Thus, by allowing the user to choose the area of the gameboard which is sorted, user engagement in the game is improved.

The terms user and player are used interchangeably throughout this document and no specific meaning is intended by using one or the other unless the context suggests otherwise.

In the following description of various implementations of the invention, reference is made to the accompanying drawings which form part thereof, and in which is shown by way of illustration various implementations in which the invention may be utilized. It is to be understood that the other implementations may be utilized, and structural and functional modifications may be made without departing from the scope of the present invention.

The techniques described herein can be deployed in many different gameplay architectures. For example, a computer device can be configured by a computer game executed on the device. The game may be implemented as a computer program (e.g. game code) that is stored locally in the memory of a PC, games console, tablet or mobile telephone or other computing device. The game can be implemented solely as a computer program that is stored and runs entirely on one of many processors in a remote server, and data streams or updates are supplied to the client device (e.g. tablet, smartphone, etc.) to enable the client to render and display graphics and sounds; this 'web services' approach is increasingly common.

Another possible infrastructure is a hybrid one, in which back-end servers handle some elements of the gameplay, and for instance a Java game applet is provided to client devices and it is the locally running Java applet that configures the client device to generates the graphics/sounds/user interaction for gameplay on the player's client device. Some data may be fed back to the back-end servers to enable scoring, interaction with other players and cross-platform synchronisation. Generally, the techniques described in this specification are not specific to any one game architecture but can be deployed on any suitable game architecture.

In implementations where some or all elements of game code are executed on a remote server, users may be able to share their gaming experiences with other users. They may, for example, be able to share the scores they have achieved in a level with other players, which may be used to generate a leader board. Users may be able to choose which other users to share their scores with, for example their friends on a social media platform such as Facebook. This gives a social aspect to the game.

FIG. 1 portrays an exemplary overall environment in which the present invention can be utilized. A virtual game is stored on, for instance, a game server 205. The virtual game is to be played on a client device 240, such as a computer 235, 225 or a smartphone or other handheld device 230. The client device 240 can also be a kiosk, arcade gaming station, smart TV or other device with computing capabilities, input devices and a screen that can present the game to a user. The client device communicates with the game server 205 and a social network server 115, for instance through the Internet 250 or other network. It should be understood that the social network server 115 and the game server 205 do not have to be located in different places, they could be on the same server or on a plurality of servers located in different locations. People skilled in the art will understand that other devices than the exemplary ones listed can also be used without departing from the spirit and scope of the invention.

The game can be implemented allowing a user to interact with it in different ways depending on the capabilities of the client device 240 which the user is accessing the game with. A user interface can comprise a display and a means by which the user can interact with the game. A user can interact with the game through using a touch screen where the user can select and/or move elements on the game board with a finger or for instance with a stylus. The game can also be played with a pointing device such as a mouse or other interaction devices such as keyboard.

Mobile devices may have a touch screen user interface where the player can interact with the game using a finger or a pointing device such as a stylus. Some mobile devices have hard keys that complement the touch screen interface. Such hard keys may be in the form of a button or in the form of a joystick type of interaction. A touch screen interface may itself provide the display.

Figure 2:
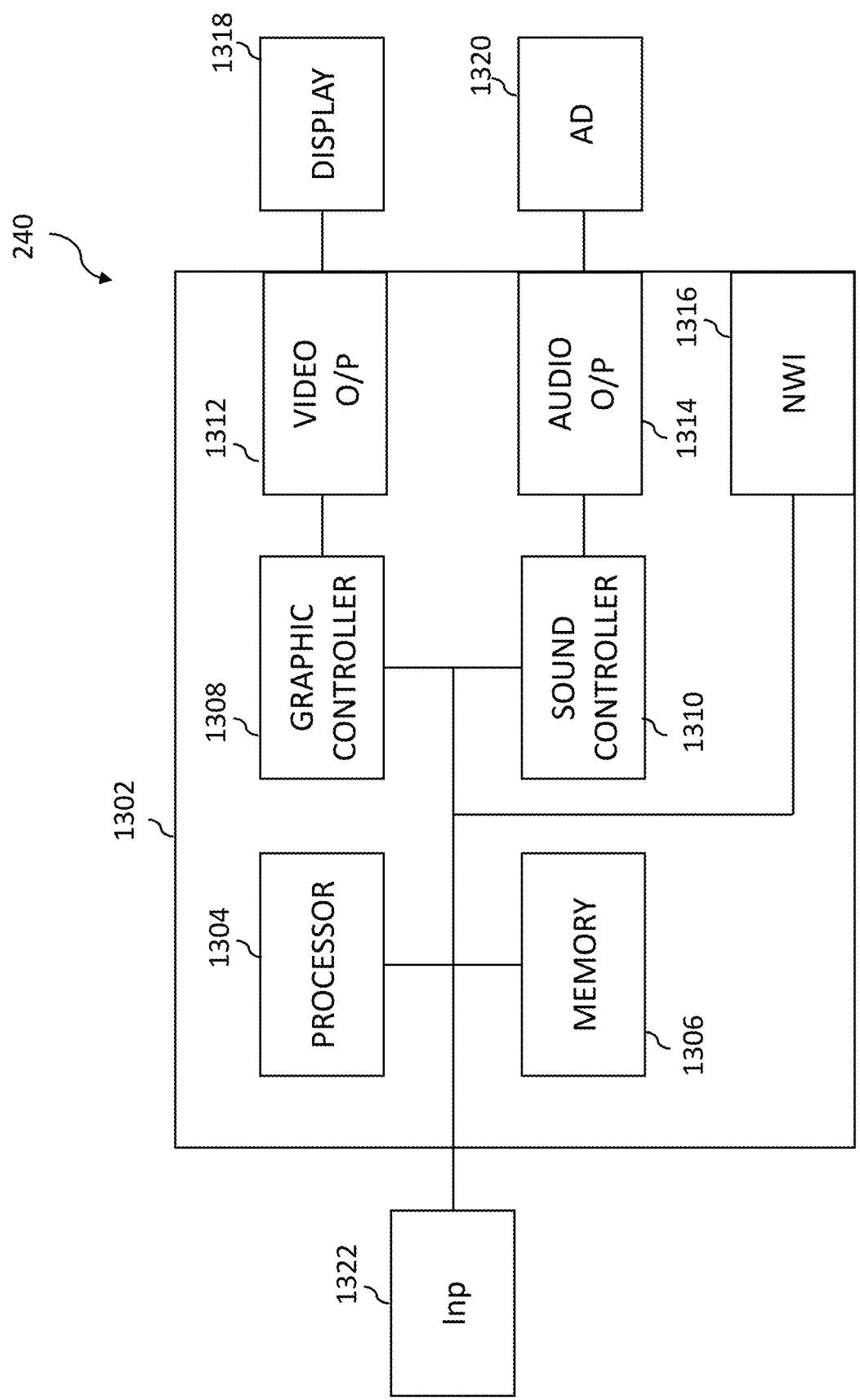
FIG. 2 is a schematic block diagram of a user device.

A schematic view of the user or computing device 240 according to an embodiment is shown in FIG. 2. The user device has a controller 1302. The controller 1302 may have one or more processors 1304 and one or more memories 1306. The controller 1302 is also shown as having a graphics controller 1308 and a sound controller 1310. It should be appreciated that one or other or both of the graphics controller 1308 and sound controller 1310 may be provided by the one or more processors 1304. Other functional blocks may also be implemented by suitable circuitry or computer code executed by the one or more processor 1304.

The graphics controller 1308 is configured to provide a video output 1312. The sound controller 1310 is configured to provide an audio output 1314. The controller 1302 has a network interface 1316 allowing the device to be able to communicate with a network such as the Internet 250 or other communication infrastructure.

The video output 1312 may be provided to a display 1318. The audio output 1314 may be provided to an audio device 1320 such as a speaker and/or earphones(s).

The device 240 may have an input device 1322. The input device 1322 can take any suitable format such as one or more of a keyboard, mouse, touch screen, joystick or game controller. It should be appreciated that the display 1318 may in some embodiments also provide the input device 1322, for example, by way of an integrated touch screen.

The blocks of the controller 1302 are configured to communicate with each other via an interconnect such as a bus or any other suitable interconnect and/or by point to point communication.

It should be appreciated that, in some embodiments, the controller 1302 may be implemented by one or more circuits, at least in part.

It should be appreciated that embodiments may be deployed in different system architectures. For example, the computer game may be implemented as a computer game that is stored in the memory 1306 of the user device 240. However, when online, the server 205 may handle some elements of the game in some embodiments. By way of example only, a Java game applet may be provided to the user device 240 and the locally running Java applet will generate, for example, the graphics, sounds, and user interaction for the game play on the user device 240. Java applet can have sufficient information to allow offline gameplay when the user device is no longer in communication with the game server 205, e.g. if connectivity is lost.

In some embodiments, the game may be implemented as a computer program that is stored in a memory system, for example the server 205, and which runs on the processor of the game server. Data streams or updates are supplied to the user device 240 to allow the user device 240 to render and display graphics and sounds in a browser of the user device 240.

The following describes an implementation using a 'clicker' mechanic where groups of two or more matching objects (referred to in this document as blocks or game elements) are removed from the gameboard when the user selects a game element in the group.

Figure 3:
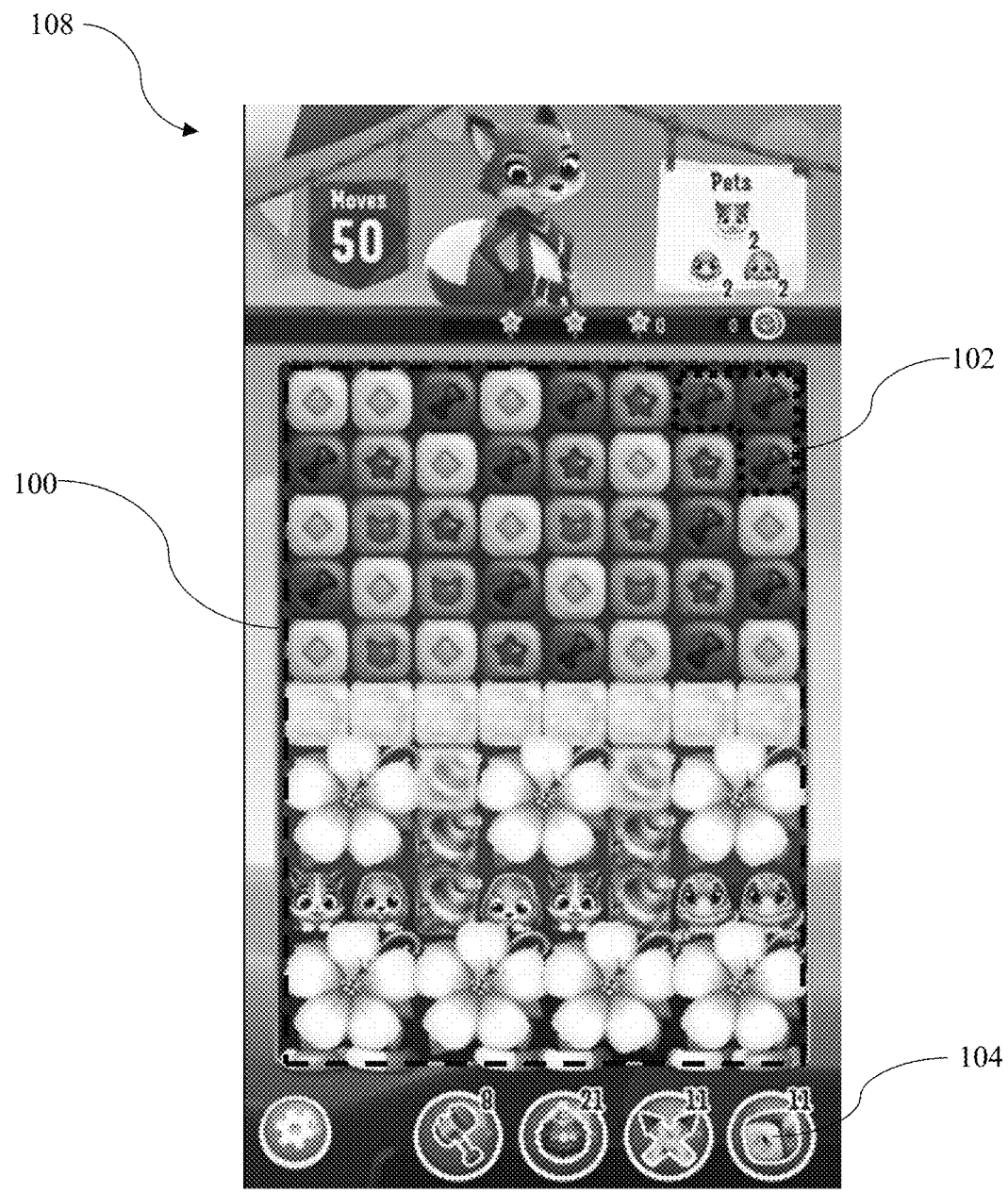
FIG. 3 shows a game play display of a clicker mechanic.

FIG. 3 shows an example of a game play display 108 of a clicker game. A gameboard 100 corresponding to grid 80 is filled with blocks or objects of different shapes and colours. There is a group of three matching purple blocks 102 on the gameboard 100, in which each game element is directly adjacent to at least one other game element of a matching type, i.e. in this case, another purple game element. The user can select this group for removal from the gameboard by clicking on any of the game elements within the group 102. Because the group 102 contains two or more matching game elements, all of the game elements in the group 102 are removed from the gameboard when the group is selected by the user.

Once the game elements in the group 102 have been removed from the gameboard, the game elements in the columns of the removed game elements fall downwards to fill the tiles rendered empty after the game element removal. In some embodiments, the empty tiles may be refilled by blocks from other directions. The direction of refill is determined by the refill physics.

As blocks fall to fill tiles rendered empty by block removal, other tiles at the top of the gameboard 100 are rendered empty. In some embodiments, these tiles are left empty. In other embodiments, new blocks are spawned to fill the now empty tiles. Block generation is described in more detail later.

The user may progress through a series of levels in a saga format. The user selects one of a number of playable levels presented to him on the display of the user interface. The levels may be represented on a 'virtual map', such that the progress of the player is represented as a journey along a path on the virtual map. When the user selection is detected, the level the user has selected is displayed to the user as a gameboard comprising user selectable game elements, such as in FIG. 3. Each level may have different goals associated with it which the user has to achieve in order to complete the level.

Goals may include, for example, removing a pre-defined number of blocks from the gameboard, rescuing a pre-defined number of animals from the gameboard, or scoring a pre-defined number of points. The user may be given a pre-defined number of game moves or amount of time in which to achieve the pre-defined goals.

The user is awarded points for removing matching game elements from the gameboard. He may be awarded more points for removing larger groups from the gameboard. As such, the user may remove blocks in a strategic manner in order to receive more points.

Figure 4:
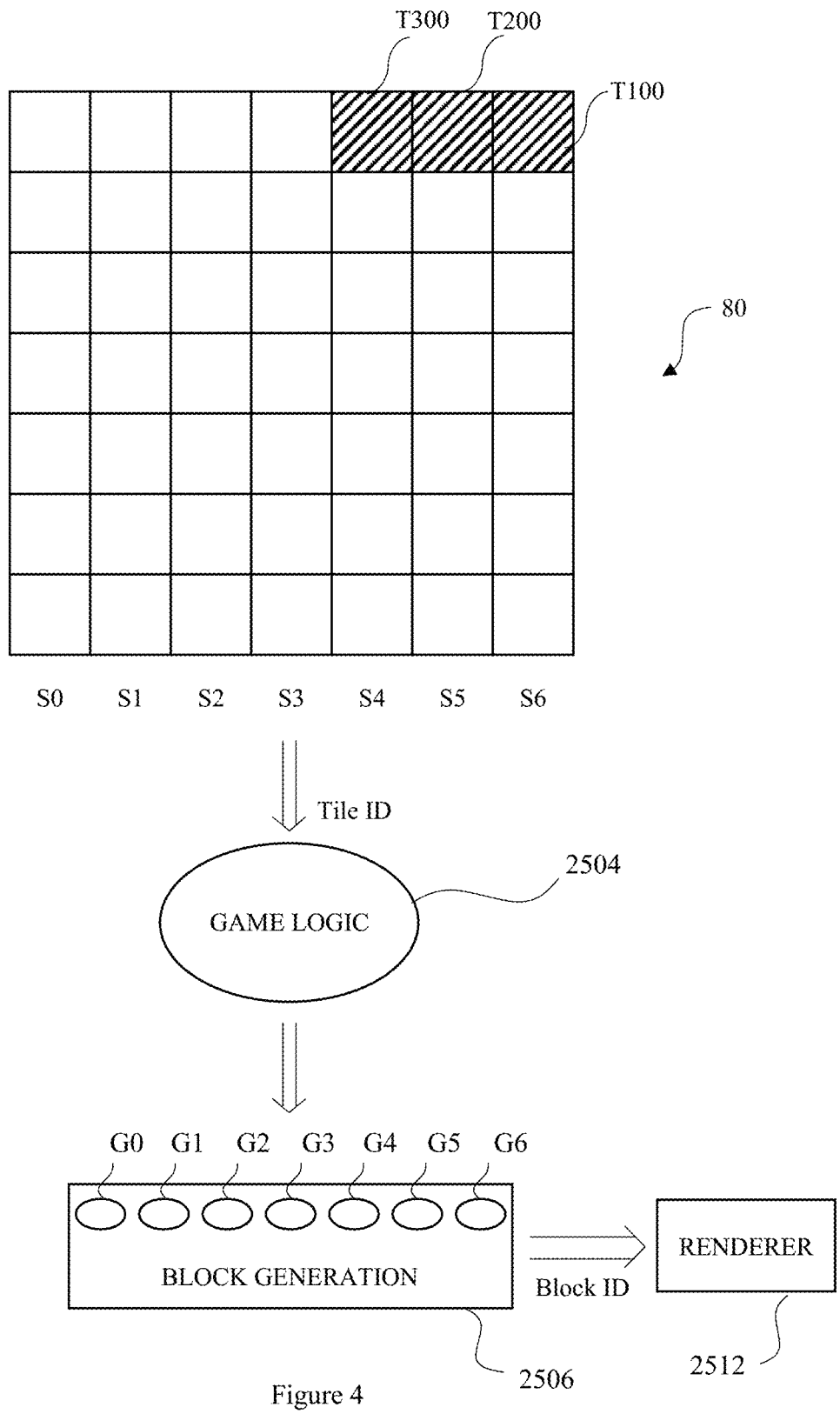
FIG. 4 is a schematic block diagram illustrating a refill process.

FIG. 4 is a highly schematic block diagram illustrating how gameboards are rendered visible to the user through a refill process. In the described embodiment, the refill process is set to random. In fact, the random refill process may be pseudorandom. Each game level has an initial gameboard which is a layout of tiles, each tile having a tile attribute in the initial layout. FIG. 4 shows a tile layout in the form of a grid 80. This tile grid 80 shows an array of tiles arranged in rows and columns. In order to render a game board on a display, each tile is associated with a block to be rendered at that tile location. The nature of the block, that is, for example, if the block contains a blocker or is playable (a normal game element), is determined by the tile attribute. Note that the nature of a block differs from a game element type or characteristic—a block may have the nature of 'normal' which may be fulfilled by interactive game elements of any type. The grid 80 is organised in sets S0 to S6. In this embodiment, each set represents a column of tiles in the array. However, sets may be organised in any appropriate manner. For example, they could be organised in rows or grids of tiles.

Shown in the tile grid 80 are three tiles T100, T200 and T300 which represent tiles where blocks may need to be spawned to replenish the gameboard. Replacement blocks are spawned in tiles that have an attribute associating them with playable (user interactable) blocks. A new block is spawned into effect at an entry point of the set. For convenience, the endmost tile (in this case T100) can be considered the entry point for S6. However, any entry point for a set can be defined, and the precise entry point may depend on the orientation or shape of the set. Blocks are spawned into sets at their respective entry points. If the tile below the entry point is vacant, the spawned block is moved down to that tile and then a further block is spawned above it at the entry point. Note that sets may be of different configurations and spawned blocks may be moved to vacant tiles according to different refill physics.

The game includes block generation logic 2506 which comprises a plurality of deterministic game element generating algorithms labelled G0 to G6. Each set is associated with a respective game element generating algorithm which spawns the new game element in a deterministic manner for its associated set. Game logic 2504 receives a tile identifier indicating a tile into which a block is to be spawned. That is, the tile identifier indicates the set in which the tile belongs, and enables the entry point of the set to be indicated. This tile identifier enables the appropriate algorithm to be activated, and a block identifier is generated by that algorithm to a renderer 2512 which controls a display 1318 on which the game board is presented to cause that block to be inserted at the entry point. Within each set the process may be entirely deterministic. That is, blocks are provided in a predetermined sequence into the set, and moved through the set in a predetermined way. That sequence may be the same for all sets, or each set may have a different sequence. Alternatively, the blocks may be spawned in a random sequence. Randomly spawned blocks will still move through the set in a predetermined way, as dictated by the refill physics.

Each generator G0 to G6 can be controlled with a respective seed which then causes a pseudo-random sequence of blocks to be generated based on that seed.

The gameboard 100 used in gameplay is defined by the tile grid 80. A tile is rendered at a location and may support a block or have another quality e.g. a hole or blocker. Each tile has its own unique ID associated with it. Data about the game elements occupying each tile of the grid are stored in association with the name, or ID, of the tile. This data may be stored in, for example, a tile database 1603 (see FIG. 5). When blocks are removed from the tile grid 80, tile refill occurs and the blocks located at the tiles affected by the refill process change. The data stored in the tile database is updated to represent the locations of elements on the grid 80 after refill.

Holes in the grid show a background and are not valid game board areas. That is, there are no tiles at the locations of the holes. Alternatively, there may be tiles at the locations of the holes in the grid 80, but the attribute of these tiles may be holes, and their attribute remains unchanged through game play. Blocks cannot occupy holes in the gameboard, but can fall through them. The shape of the grid may vary.

The following sections will refer to a game with a clicker mechanic. The ideas explained may also be implemented for games with other mechanics. Such games are implemented on a gameboard 100 comprising a gameboard, e.g. a grid of tiles with fixed locations.

Figure 5:
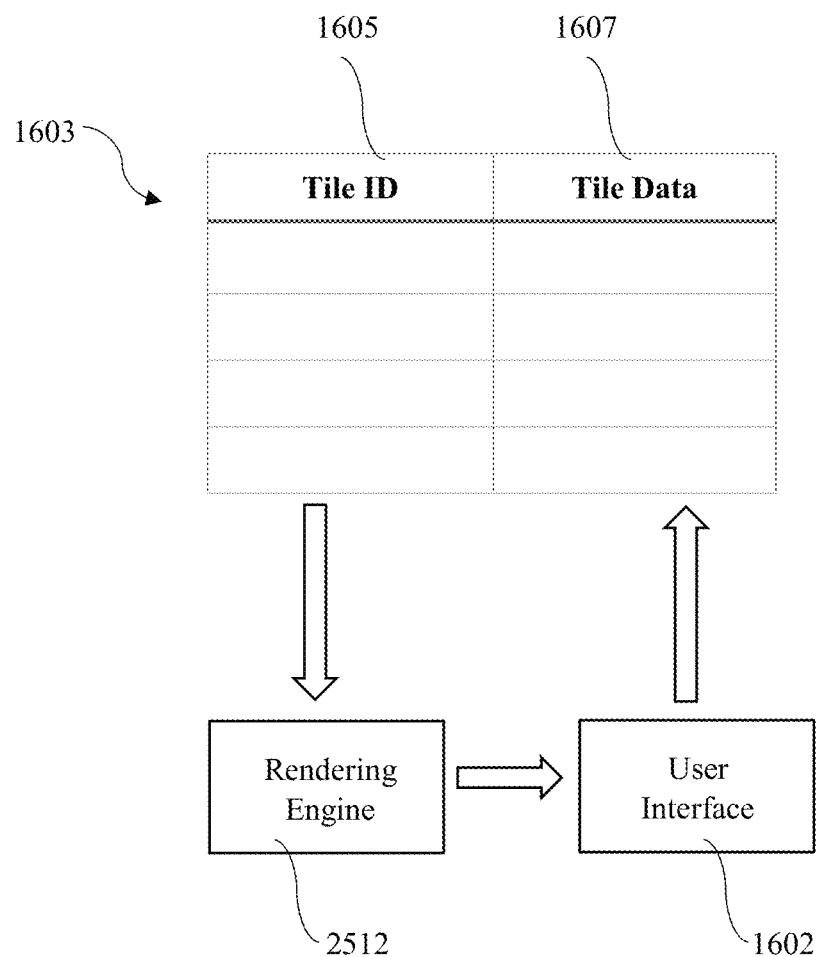
FIG. 5 shows an example database for storing data associated with the tiles of the gameboard.

FIG. 5 illustrates a data structure for managing tile data and schematically illustrates the interrelation between the data structure 1603 and a rendering engine 2512 of a graphics controller 1308. The graphics controller 1308 is illustrated in FIG. 2. The data structure 1603 can be held in any suitable storage circuitry, such as illustrated by memory 1306 in FIG. 2. The rendering engine 2512 controls the display on a user interface 1602 which receives the video output from the graphics controller 1308 illustrated in FIG. 2. The user interface 1602 may comprise the input device 1322 and the display 1318. These components may be one entity, such as a touchscreen, or they may be separate entities, such as a screen and a mouse. Alternative embodiments of these devices are discussed earlier with reference to FIG. 2.

The data structure 1603 is responsible for managing how the visualisation of replenished tiles are delivered to the user interface. Each tile has a tile ID 1605. The tile ID 1605 can define the location (e.g. the x,y position in a grid) on the user interface where the tile is to be replenished, that is governed by the vacancy which has been generated due to the removal of game elements from the gameboard. This allows the rendering engine 2512 to generate that tile at an appropriate location on the user interface display 1602. Each tile ID 1605 is associated with tile data 1607 which defines how the tile is to be displayed, that is what game element it has associated with it, and whether it has any "blockers" in addition to or instead of a game element. The tile data 1607 also defines whether the element associated with the tile is sortable, that is, can the element move tile location on the gameboard when a 'sorting' booster is applied. This type of booster is described later. An element identifier may also be stored as part of the tile data 1607. This may define one or more properties of the game element associated with the tile ID 1605. This can include the type or characteristic of game elements used to determine matching groups of game elements. Alternatively or additionally, there may be stored in a data structure a list of block (element) IDs, which are each associated with the tile ID 1605 corresponding to the tile at which the block is located while the blocks are on the gameboard, and, if the block has been removed from the gameboard, there is no associated tile ID 1605.

Some game elements have special characteristics associated with them. These special game elements are referred to as 'boosters'. When boosters are activated, the special effect associated with the booster is implemented on the gameboard. Some examples of known booster effects are: the removal of all game elements in the row and/or column containing the booster; removing all game elements adjacent to the booster; removing all elements of the same colour as the booster.

A new booster is described herein. This new booster allows the player to select an area on the gameboard in which the game elements will be rearranged into a sorted configuration such that the game elements are sorted into groups of matching types, for example colour. This booster is referred to as a 'sorting' booster. Sorting the game elements into groups of adjacent matching game elements allows the user to remove these matching groups from the gameboard.

Figure 6:
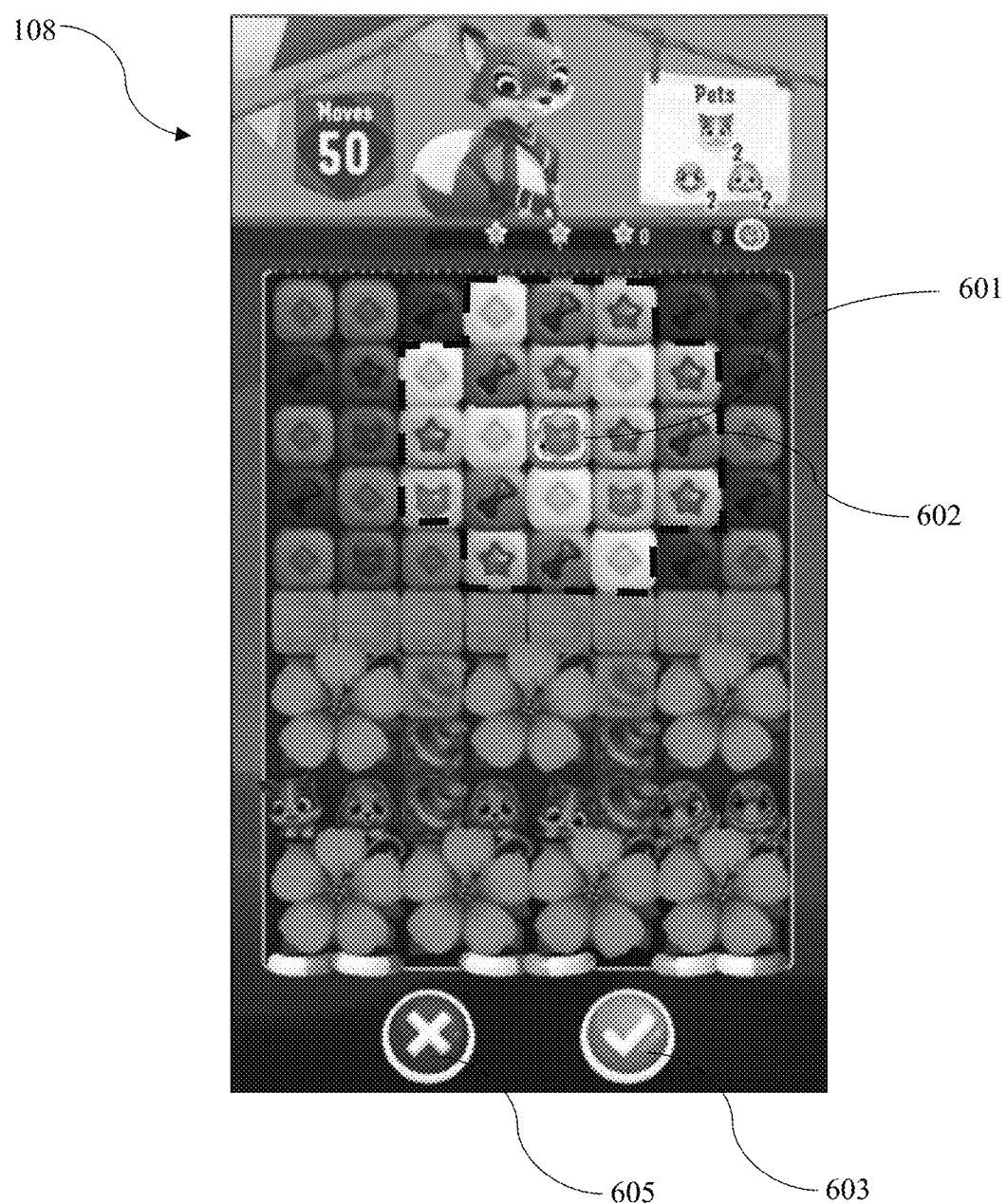
FIG. 6 shows an example of a region to be sorted when a sorting booster is activated.

FIG. 6 shows an example of the game play display 108 when the user is viewing a region which will be affected by the sorting booster. In this example, the gameboard 100 is a grid 80 comprising 8×11 tiles. It will be appreciated that grids 80 of other dimensions may be used.

The user may select the sorting booster to locate and activate is. The location and/or effective area of the booster may be visualised, as described later. In some embodiments, the booster is not provided to the user on the gameboard 100, but rather is provided to him outside of the gameboard such that he can use it at any time during gameplay. This can be seen in FIG. 3, where a visualisation of the sorting booster 104 is rendered below the gameboard 100. The user selects the booster by, for example, clicking on the visualisation of the booster 104. Once the user has selected the sorting booster, he chooses a tile on the gameboard at which to activate the booster. The tile at which the user chooses to activate the booster is referred to as the target tile or activation tile.

When the booster is activated, it generates a booster effect in which it sorts the sortable game elements within a pre-defined region, such that matching elements in said region are grouped in a sorted configuration. The region (effective area) in which the effect of the booster is experienced is referred to as the sort region. In the example of FIG. 6, the user has selected target tile 601 such that a visual indication of the sort region 602 is rendered, such that the tiles in the sort region 602 are visually distinguishable from the rest of the tiles on the gameboard. In this example, the sort region 602 comprises tiles in a 5×5 square including the target tile, with the four corner tiles removed. It will be appreciated that the size and shape of the sort region 602 may vary. The sort region 602 may be defined differently for different game levels, or the sorting booster may be associated with a pre-defined sort region 602. In some embodiments, there may be a number of different sorting boosters which are associated with different sized sort regions 602, such that the user can choose the size of the sort region he desires by selecting the corresponding sorting booster. The dimensions of the sort region 602 are less than or equal to the dimensions of the grid 80. The dimensions of the sort region 602 may be chosen such that the effects are large enough to be beneficial to the user, but not so large as to make the level so easy for the user, for example by sorting the majority of the game elements, that the user loses interest.

In one embodiment of game logic which generates the booster effect, the tiles encompassed by the sort region 602 are determined by the target tile. That is, the area (tiles) over which the effect of the booster is experienced is determined based on the tile ID 1605 of the target tile, from which its location can be determined. In the example of FIG. 6, target tile 601 is the centre point of the sort region 602. It will be appreciated that the tile location chosen by the user may have a different relative position to the sort region 602. For example, the target tile may define the tile in the top right-hand corner of the sort region 602. Other relative layouts may also be possible. The relationship between the target tile and the sort region may be pre-defined by the level the user is playing, or by the sorting booster characteristics. This relationship is held in a memory which may be accessible by or part of the game logic.

Figure 7:
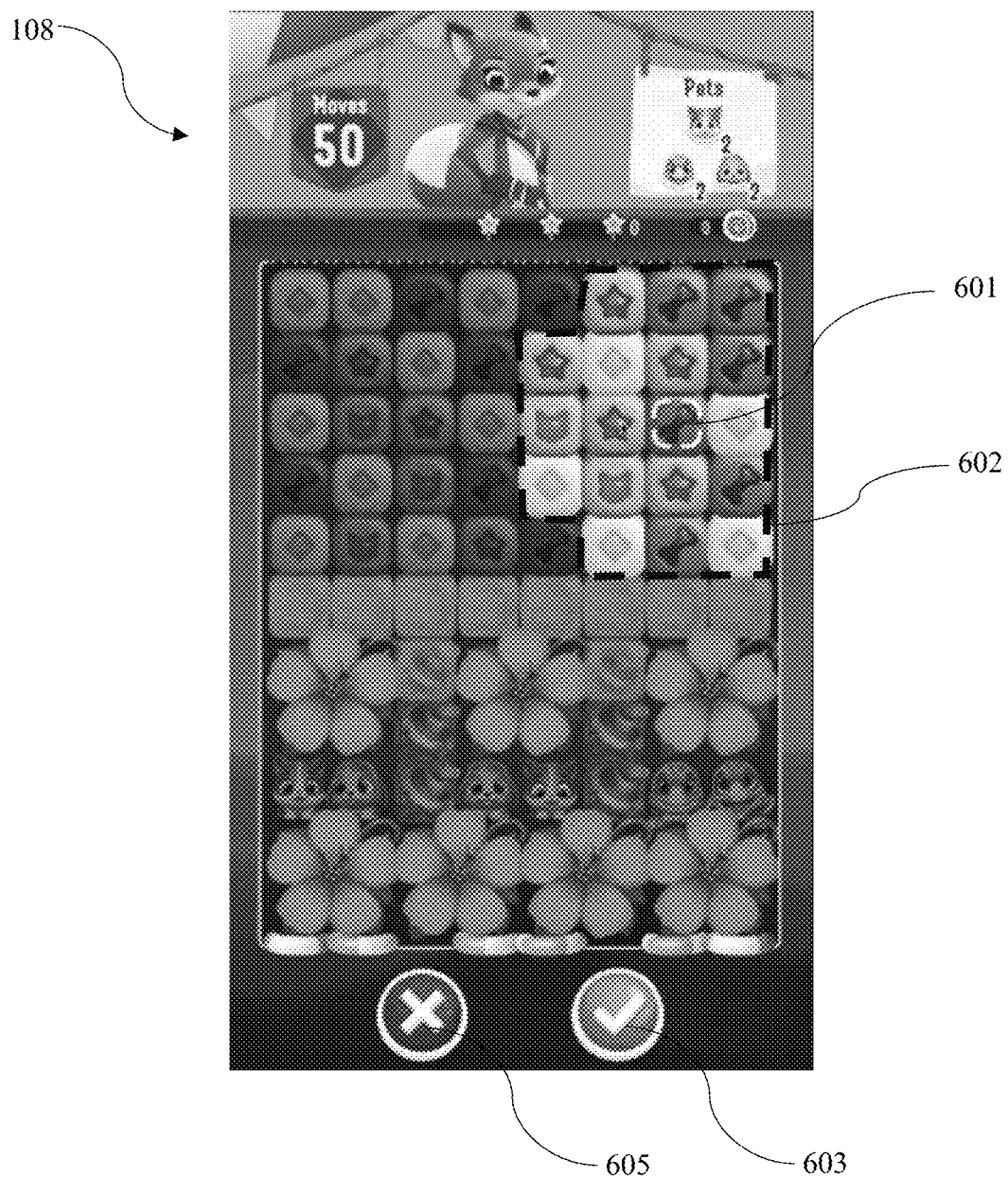
FIG. 7 shows a reduced region to be sorted.

The user may choose to implement the sorting booster at a tile location which does not allow for a full-sized sort region 602. For example, when a 5×5 grid with removed corners, as in FIG. 6, is the shape of the sort region 602, a tile which is at the edge of the gameboard, or only one column in from the edge of the gameboard, may be chosen as the target tile (or activation tile), provided the sort region 602 is valid, as discussed later. By selecting such a tile, the sort region 602 is reduced. An example of this is shown in FIG. 7, where the target tile 601 is one column in from the left-hand edge of the gameboard. As such, the sort region 602 is reduced by three tiles.

Once the user has selected the sorting booster, but before activating the booster, he can move the booster around on the gameboard 100. The visual indication of the sort region 602 associated with each tile location may be rendered visible to the user when the user moves the booster to that tile location. The visual indication may be in the form of highlighting all of the tiles in the shuffle are 602, the game elements not included in the sort region 602 may be darkened, as in FIG. 6, or there may be an outline around the shuffle group 602. In some embodiments, the game elements are distinguished by enlarging them, and/or through a visual depiction of displacement of the game elements out of the plane of the gameboard ('popping up'). In some embodiments, the visual indication is only rendered if the tile location is a valid one. Valid tile locations are discussed in more detail later. In other embodiments, the visual indication of the sort region 602 is rendered in different colours for valid and invalid tile locations. For example, the visual indication is green if the location is valid and red if the location is not valid. In some embodiments, only sortable game elements in the sort region are identified in the visual indication of the sort region 602, for example highlighted, as in FIG. 8, where the blockers 604 in the sort region 602 are darkened.

There may also be a visual representation of the sorting booster itself. This may be either on or outside the gameboard, or both. For example, there may be a visual location indicator on the gameboard at the location of the target tile which visually distinguishes it from the tiles on the gameboard. An example of this is shown in FIG. 6, in which the target tile 601 has a border around it indicating its selection by the user. As the user moves the sorting booster, and thus the sort region 602, the visual location indicator of the booster also moves. The visual location indicator may be distinguished using one or more of the methods discussed above with relation to the visual indication of the sort region 602.

Another example of a visual representation of the sorting booster is visual activation controls. Examples of these are shown in FIG. 6. A visual accept activation control 603 and a visual inhibit activation control 605 are shown below the gameboard on the game play display 108. Once the desired sort region 602 has been selected, the user confirms the activation of the booster effect by clicking on the accept activation control 603. If the user decides he does not wish to use the sorting booster, he clicks the inhibit activation control 605, which deselects the sorting booster, such that the user can select matching groups of game elements for removal from the gameboard as in 'normal' gameplay. Such visual activation controls may be shown on the gameboard next to the visual location indication, such that they move on the gameboard with the location indication as the user moves the location of the booster. The visual activation controls may form part of the visual location indication itself. That is, selectively the indication on the target tile could activate the booster.

There may be a visual representation of the sorting booster outside of the gameboard which can be moved by the user so as to move the resulting sort region 602 on the gameboard. The relative movement of the visual representation outside of the gameboard may correspond to the relative movement of the sort area 602 on the gameboard. The off-gameboard visual representation may act like a joystick for the user to move the sort area 602 on the gameboard.

It will be appreciated that there may only be a visual indication of the sort region, or a visual representation of the booster, or there may be both as in the example of FIG. 6. The visual representation may comprise one or more of the visual location indicator and the visual activation control.

In some embodiments, there are tiles on the gameboard which do not allow the game elements at those locations to be sorted. This is defined by the tile data 1607. The game elements at these tile locations may appear to be sortable, that is they look like sortable elements such as coloured game elements without any special characteristics, but they cannot be sorted due to their location on the gameboard. If such tiles are within the sort region 602, they may be visualised to the user on the display. For example, if the elements in the sort region are highlighted, the elements in the tiles which do not allow for sorting may not be highlighted. Alternatively, said game elements may be highlighted in a different colour, for example.

The user may select the tile at which to activate the sorting booster in a number of ways. He may drag a visual representation of the booster from outside of the gameboard onto the gameboard and select the tile at which to activate the booster by releasing or dropping the booster at that location. For example, is the user device comprises a touch screen, the removal of the user's touch 'drops' the booster at the target tile. A possible disadvantage of using this activation method id that the user may inadvertently activate the booster by removing his touch accidently. In other embodiments, the user may select the booster by clicking on it, then click on a tile on the gameboard to visualise the sort region 602 associated with that tile, and then confirm activation of the booster at that tile using the accept activation control 603, such that the user has to actively trigger the booster.

When the user activates the sorting booster at the chosen target tile location, the game elements at the target tile remains on the gameboard and is involved in the sorting. That is, the placement of the booster on the gameboard does not result in the removal of the game elements at the target tile from the gameboard.

Figure 8:
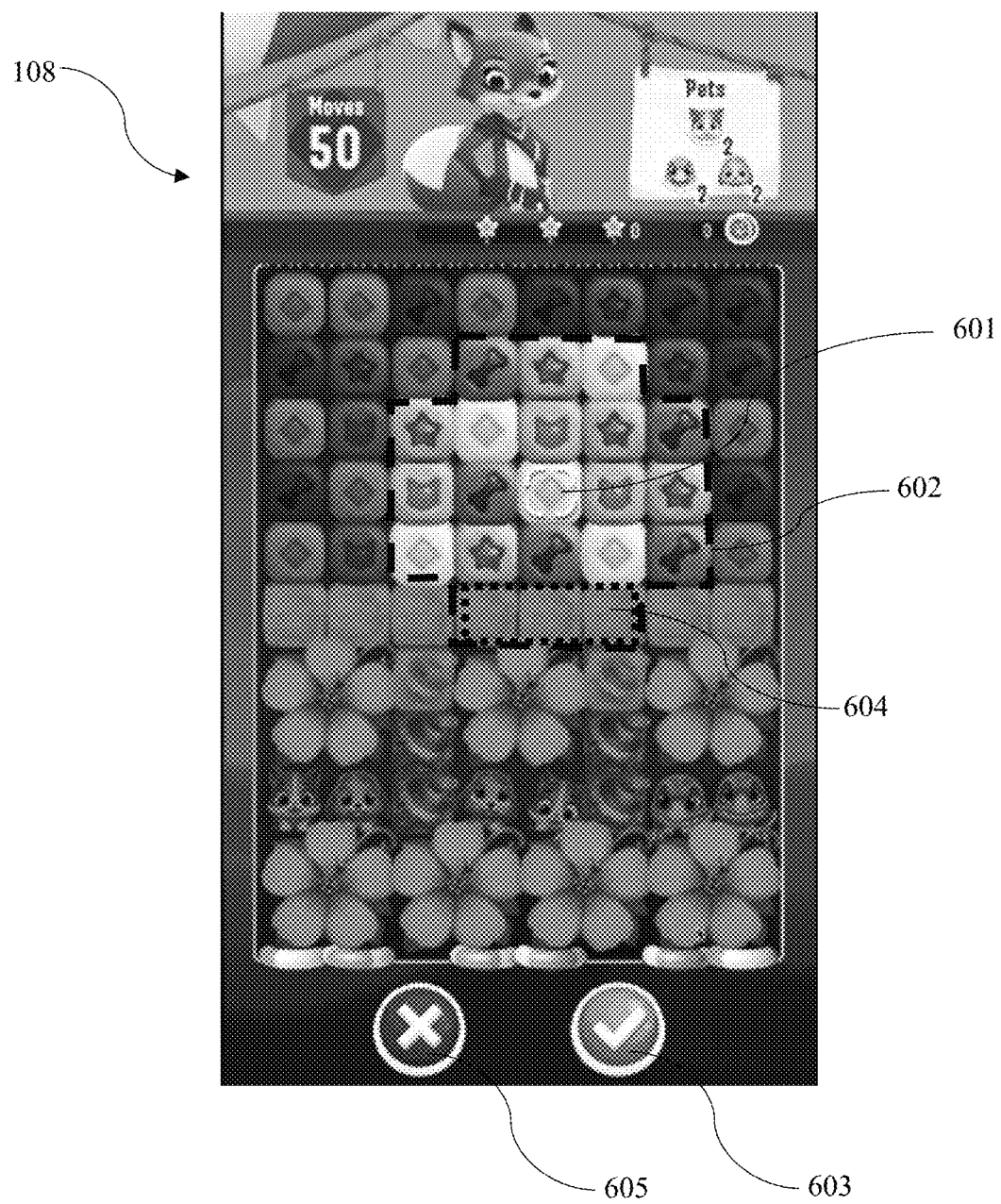
FIG. 8 shows a game play display before the user activates a sorting booster.
Figure 9:
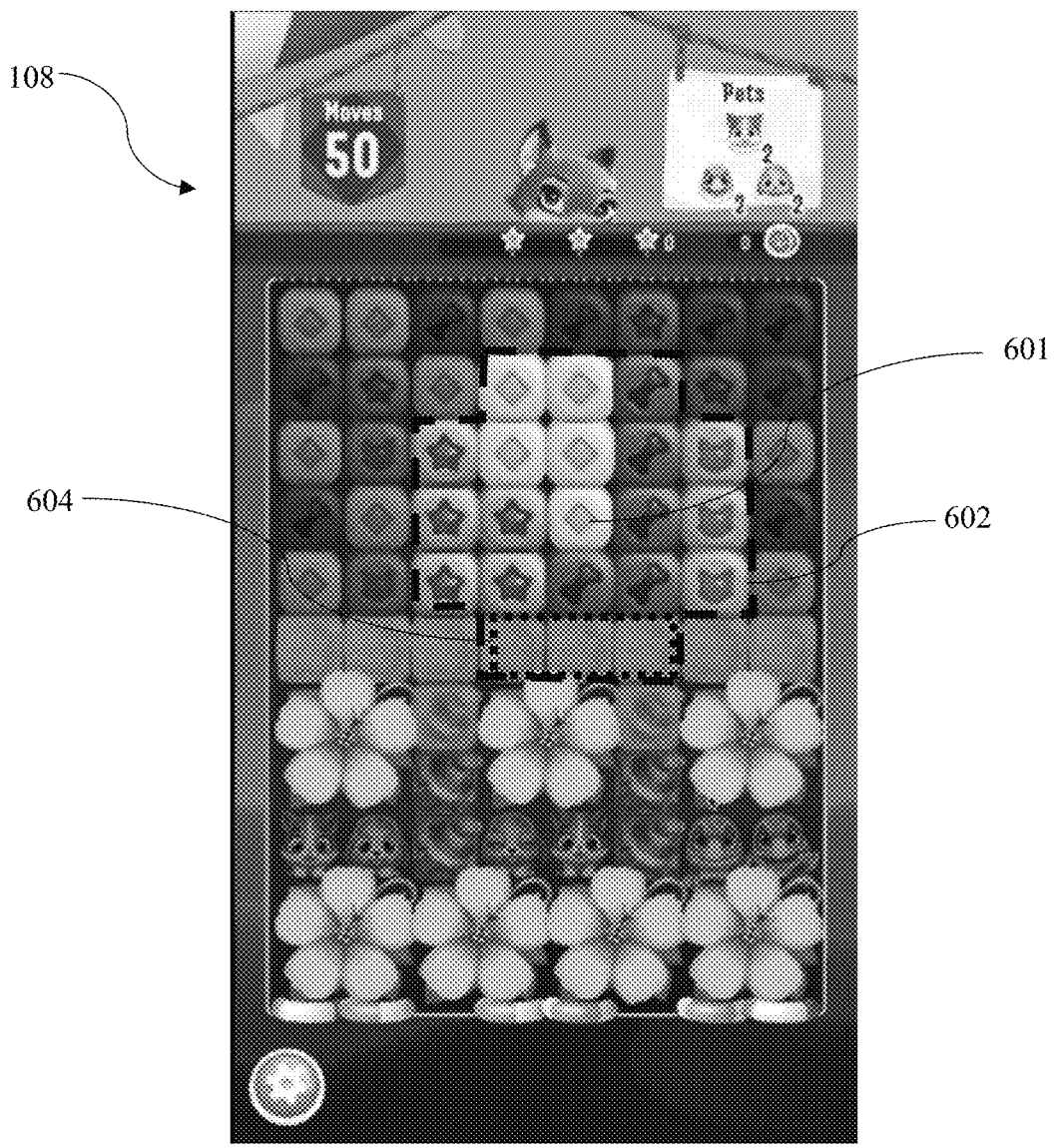
FIG. 9 shows a game play display after the user activates a sorting booster.

FIG. 9 shows the gameboard 100 after the user has activated the sorting booster at the target tile 601, such that the booster effect is generated in the sort region 602 as defined in FIG. 8. The game elements inside the sort region 602 have been rearranged such that all elements with a matching characteristic, in this case, matching colour, are grouped together. The matching game elements are sorted such that each element in the group is directly adjacent to another game elements of the same type. The elements remain within the sort region 602 on the gameboard.

The three blockers 604 within the sort region 602 remain on their current tiles when the sorting booster is applied. This is because blockers are non-sortable elements. Another example of a non-sortable element is a booster. Whether an element on a tile is sortable or not is stored as part of the tile data 1607 in database 1603.

As mentioned above, some tile locations are associated with valid sort regions 602 and some with invalid sort regions 602. A valid sort region 602 is one in which the game elements can be rearranged to create groups of matching game elements, where at least one group of game elements with a matching characteristic contains at least one additional element after the sorting has occurred. For example, if the sort region 602 prior to the activation of the sorting booster contains a pair of red game elements situated together, three blue game elements situated together, one green element situated alone, one red element satiated alone, and 14 blockers, the sort region 602 is a valid one since the game elements can be rearranged such that the single red element is grouped with the pair of red elements, thus increasing the size of one of the groups of one of the matching game elements. If no such increase in group size is possible in the sort region 602, the sort region 602, and target tile, are invalid.

In some embodiments, an attempt to activate a sorting booster at an invalid target tile. In other embodiments, the user can activate the sorting booster an invalid target tile, which results in the game elements in the invalid sort region 602 being randomly shuffled.

In some embodiments, the elements surrounding the sort region 602 are checked and used to determine if the sort region 602 is valid. For example, it may not be possible to increase the size of a group of matching game elements in the sort region, but it may be possible to rearrange the game elements in the sort region 602 such that there is a matching group with at least one game element bordering the sort region 602 and at least one game element within the sort region 602.

Figure 10:
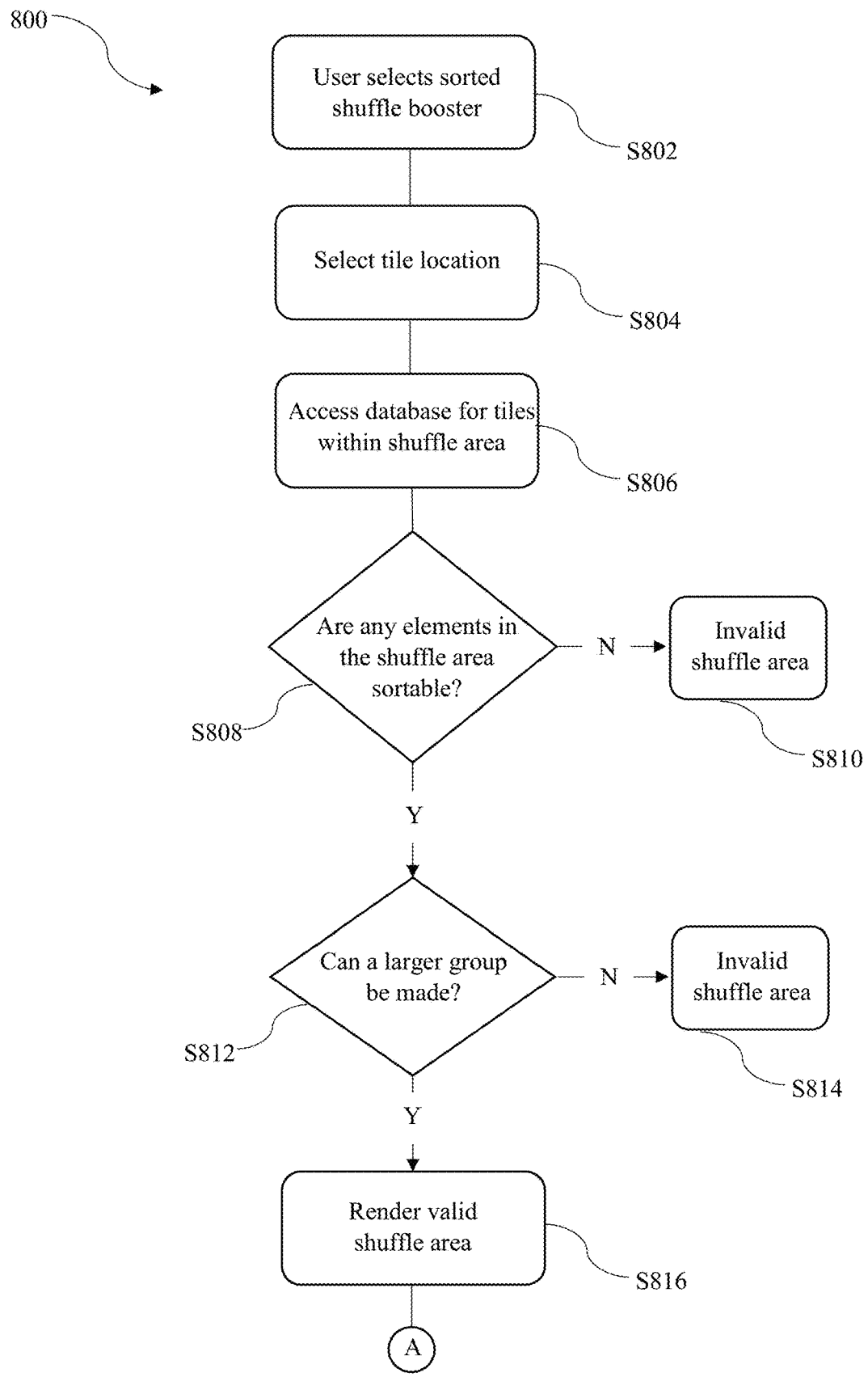
FIG. 10 is an example method for determining the game elements to be sorted and sorting said game elements.
Figure 10:
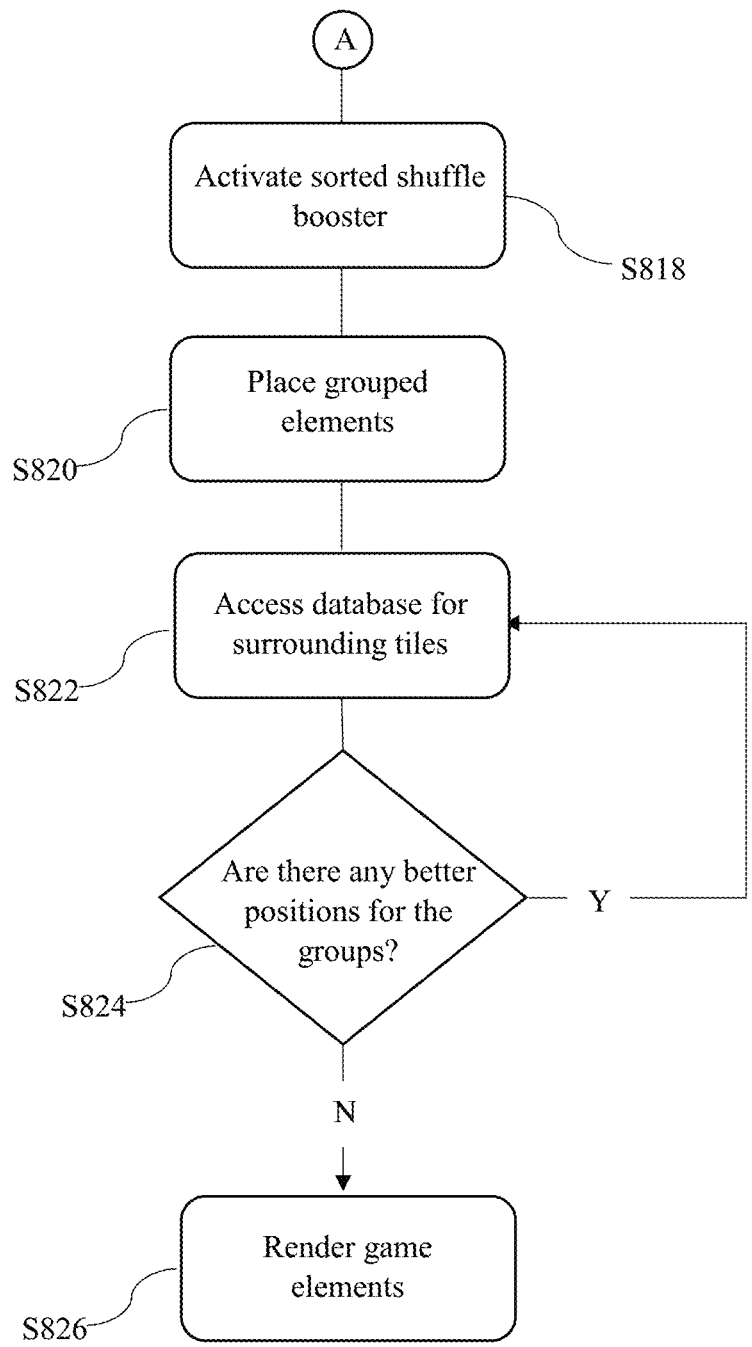

FIG. 10 shows a flow diagram of a method 800 for implementing sorting.

At step S802, the user selects the sorting booster. At step S804, the user selects a tile on the gameboard to assess the sort region 602. In the case of dragging and dropping the booster, this tile selection is the user hovering over the tile. In the case of active triggering of the booster, this is the user clicking on the tile before activating the booster. Alternatively, the booster is not shown on the game play display 108, and the user selects to use the sorting booster by selecting a tile on the gameboard. The user may have to select the tile in a special manner to indicate that he wishes to select to use the sorting booster, for example, he may have to hold the tile for a period of time, or right click on the booster if using a mouse.

At step S806, the database 1603 is accessed. The tile data 1607 associated with the tile IDs 1605 of all of the tiles within the sort region 602 is accessed. The tiles within the sort region 602 are determined by the target tile 601 and the relationship between the target tile 601 and the sort region 602. The target tile 601 is determined by the user input, and the tile ID 1605 corresponding to the target tile 601 can be found. The relationship between the target tile 601 and the sort region 602 is accessed from the memory location at which it is stored. The tile IDs 1605 corresponding to the tiles within the sort region 602 can then be determined using the defined relationship and the tile ID corresponding to the target tile, and corresponding tile data 1607 accessed for each tile in the sort region. The tile data 1607 determines the characteristics/type of the elements on the tile, for example, the colour of the game element, if there is a blocker at the tile, if there is a booster at the tile and the characteristics of the booster, etc. The tile data 1607 also defines if the element at the tile can be sorted.

At step S808, the tile data 1607 of the tiles within the sort region 602 is used to determine if any of the elements within the sort region are sortable. If none of the game elements are sortable, for example, if all of the tiles contain blockers and/or boosters, the process moves to step 810, where it is determined that the sort region 602 is invalid. The sort region 602 may or may not be rendered to the user, as discussed above.

If, however, at least one of the tiles in the sort region 602 contains a sortable element, the process moves to step S812, where it is determined if a larger matched group can be made by rearranging the elements in the sort region.

The tile IDs 1605 of the elements with matching characteristics, for example, colour, are grouped together. The tile IDs 1605 corresponding to the sort region 602 are accessed and the associated element IDs retrieved from the database 1603. The type of each element is determined by the tile data 1607 stored in association with the element IDs. A list of the element IDs of each type of element in the sort region is generated, such that the matching elements are identified. The tile IDs 1605 corresponding to the element IDs in each list are used to determine the current locations of the game elements in each list. From these tile IDs 1605, it can be determined if there are tiles of the same type which are not currently grouped together on the gameboard. This is the case if the tile IDs 1605 of the matching game elements are associated with tile locations which are not grouped together on the gameboard.

If it is found that there are matching tiles which are not grouped together on the gameboard, the process moves to step S816, where a visual indication of the valid sort region 602 is rendered to the user on the gameboard.

However, if the grouped tiled IDs found in step S812 indicates that all of the matching game elements in the sort region 602 are already grouped together, the sort region is determined to be invalid at step S814. Again, this invalid sort region 602 may or may not be rendered to the user, as discussed above.

Once the user has found a valid sort region 602, he may choose to activate the sorting booster, step S818. As described above, in some embodiments, this may be by dropping the booster at the desired tile location. In other embodiments, where the user selects the target tile by clicking on the tile location, the user actively confirming activation, for example by using the accept activation control 603.

At step S820, the sortable game elements in the sort region 602 are 'placed' at new tile locations on the gameboard to generate a sorted configuration in which matching elements are grouped together in matching sets or groups. The placement of the game elements at these tile locations may not be rendered to the user at this stage in the process. The sortable game elements are placed around the non-sortable elements, which maintain their current tile locations. The sorted configuration found at this step in the process is a trial sorted configuration. It may or may not be the final sorted configuration of the game elements in the sort region 602, depending on the outcome of the following steps. Hence, this sorted configuration may not be rendered on the gameboard.

The matching sets may be determined and located in a number of different ways. The groups may be placed in order of size. For example, the largest number of matching game elements may be identified first and allocated to a location in the sort region 602, followed by the second largest, and so on, until all sortable elements have been placed. Alternatively, a type (e.g. colour) may be selected at random and the group of matching game elements of that colour are placed first, then a second colour is selected at random and the group containing game elements of that colour are placed second, and so on, until all of the game elements are placed on the gameboard. Alternatively, there may be a pre-defined order for placing sortable game elements, for example based on the elements' colour (e.g. yellow, purple, red) regardless of the relative size of the matching sets.

There may be a pre-defined location for placing the first group of elements. For example, the first group may be placed at the top of the sort region 602, and subsequently placed groups are placed in descending order down the sort region. Alternatively, the groups may be placed at random locations in the sort region 602.

When the game elements are placed in step S820, the tiles locations at which they are placed are referred to as trial tiles. The tile data 1607 of the tile IDs 1605 associated with the trial tiles are altered to match the characteristics of the game elements which have been placed at the corresponding tile locations. These trial tile locations are not rendered to the user.

At step S822, the database 1603 is accessed and the tile data 1607 of the tiles surrounding the sort region 602 is accessed. At this step, it is determined if there are any game elements bordering the sort region 602 which match any of the game elements within the sort region 602, and if any of these game elements are in groups of matching game elements outside of the sort region 602.

At step S824, the quality of the placement of the groups is assessed. The trial tiles of the groups are compared to the locations of any identified individual or groups of matching elements outside of the sort region 602, as found at step S822. If the groups of game elements in the sort region 602 can be rearranged such that the groups within the sort region 602 are adjacent to matching elements or groups outside of the sort region 602 which would result in larger matching groups than with the game elements in the presently trialled configuration, it is determined that there are better tile locations for the groups in the sort region 602, so the process returns to step S822, where an alternative configuration is trialled.

However, if the groups within the sort region 602 are found to be in the optimum position relative to the game elements surrounding the sort region 602, the process moves to step S826, where the game elements are rendered on the gameboard in a sorted configuration at the corresponding trial tiles, which become the respective current tiles of the game elements.

It will be appreciated that some of the steps of method 800 may occur in a different order, or may not be included in the process. For example, in some embodiments, the game elements surrounding the sort region 602 may not be considered when determining the new locations of the game elements within the sort region 602. In this embodiment, steps S822 and S824 are removed, and the game elements are rendered directly after placement.

In other embodiments, the surrounding game elements are considered before the placement of the groups within the sort region 602. For example, the step of accessing the tile data associated with the surrounding tiles, step S822, may occur before step S820, such that the groups are placed in their optimum position relative to the surrounding game elements when they are first placed. This removes the need for step S824.

In other embodiments, the steps of placing matching groups in the sort region 602 and checking to see they are in the best position relative to the game elements outside of the sort region 602 occur for one colour at a time. That is, the first group of matching game elements may be placed in the sort region 602 and then the surrounding elements checked for that colour and the best location for that group determined, followed by the placement of the second group and checking that is the best location based on the surrounding game elements from the remaining tiles within the sort region 602 after the first group has been placed, and so on, until all of the groups have been placed. This means that steps S820 and S824 would be performed for game elements of a single game elements characteristic, for example colour, and there would be an additional step in the method 800 after determining that no better location could be found of checking to see if there are any more groups to be placed on the gameboard. If there are more groups, steps S820 to S824 are repeated until all of the groups have been placed. If there are no more groups to be place, the process proceeds to the rendering step, step S826.

Sorting boosters may be gained in a number of ways. The user may exchange virtual tokens for the booster. Virtual tokens, such as 'gold bars', may be awarded to the user for achieving pre-defined targets, for example. A user may also be able to purchase virtual tokens to exchange for sorting boosters, or purchase the boosters directly. Alternatively or additionally, a user may be awarded the sorting booster. He may be awarded the booster for good game play, for example for achieving a pre-defined target. The user may be given sorting boosters in 'gift boxes', which are rewards given to users after a pre-determined period of time. In some embodiments, sorting boosters may be created through a pre-defined game mechanic, such that when the user implements the game mechanic on the gameboard during game play, the booster is created and presented to the user.

Due to the mechanic by which the sorting booster is implemented, the booster need not be presented to the user on the gameboard. This allows the user to choose which area of the gameboard to sort. The user may be able to acquire the booster in one level and he may use it in that level or in another, or he may acquire the booster while in the saga map or some other pre-level screen. The booster, therefore, may be transferable between levels. In some embodiments, however, the user may not be able to transfer the booster to another level. In some embodiments, the user may enable the sorting booster on a pre-level screen, having already acquired the booster, such that the sorting booster is available for the user to use when he enters the level. In other embodiments, the sorting booster is available for the user to use in any level once he has acquired it, such that no pre-level enabling of the booster is required.

In the above description, all of the game elements within the sort region 602 are grouped into groups of game elements with matching characteristics. It will be appreciated that, in some embodiments, not all of the game elements are grouped. For example, the sorting booster may rearrange the game elements within the sort region 602 such that all of the game elements which have a colour matching that of the game element at the target tile are grouped, and the other game elements in the sort region 602 are randomly shuffled. The matching game elements may, for example, be grouped around the central game element at the location of booster activation.

Figure 11:
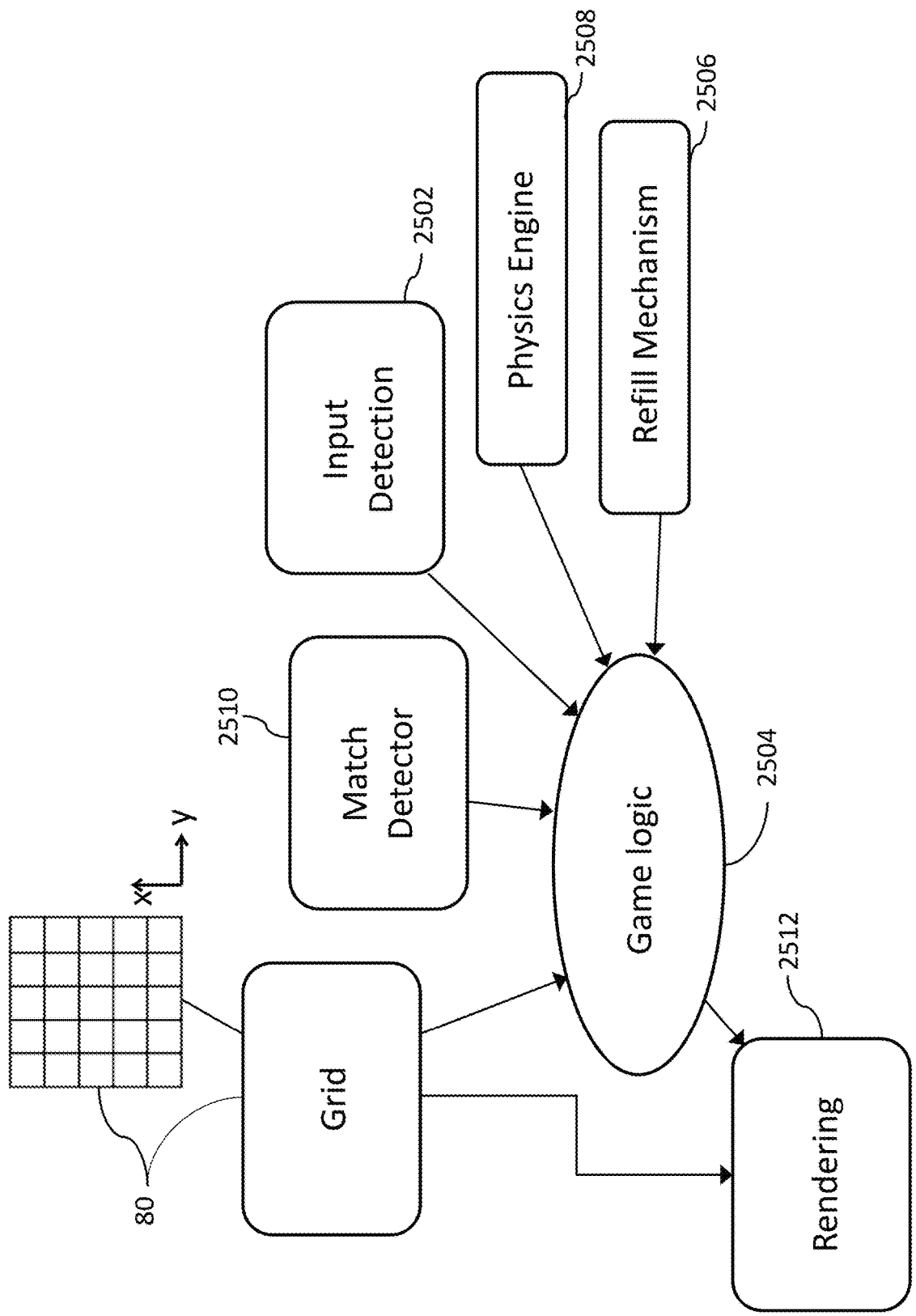
FIG. 11 shows a view of the functional components of the game.

FIG. 11 shows a schematic representation of the functional blocks of an embodiment of the present invention used to enable game play, such as that discussed above. Input detection 2502 captures the user input and feeds the input to the game logic 2504. The user input can be provided via any suitable user input device, such as those described above. In the context of the game, this user input can be used in a game view to indicate which game objects have been selected by a user, and thus to indicate the blocks to be switched and checked for adjacent matching blocks. The game logic 2504 will process the information provided by the user input. The game logic 2504 may then determine if a valid selection has been made, and what the outcomes of the selection should be.

The rendering block is used to render the gameboard 100 to the user. It renders the game elements on the gameboard 100. Each time game element moves tile location, for example, during gameboard refill, the rendering block is used to render this movement visible to the user on the display 1318 of the user device 240. The rendering block may also be used to render the visual indication of the sort area 602 and the visual representation of the booster on the user interface.

The grid component 80 stored in a memory provides a grid representation of the game board as shown schematically in FIG. 11. The grid component can be supplied by any suitable data structure, held in a local memory or remote memory accessible by the device, and is responsible for identifying each tile location on the game board and thus providing a tile ID with which to associate information about the game element displayed at that tile location. This associated information may then be used in combination with other components in order to control the rendering of the display, e.g. a match detector component 2510, and a refill mechanism component 2506.

Each game element has object data associated therewith. The object data may be stored in any suitable memory location. In some embodiments, the object data may be provided by a data structure. In some embodiments, the object data may be considered to be part of the game logic and in other embodiments may be considered to be outside the game logic. The object data may provide information as to the properties of a game element or block. These properties can include attribute information of type/characteristic such as colour and/or whether or not a game element has a particular function such as a booster function and/or whether the block is sortable.

The game logic 2504 will determine the blocks selected by a user, and the actions to follow to implement the game mechanic.

Thus, the game logic controls the rules for determining if a valid group has been selected for removal from the gameboard. The game logic 2504 operates according to a set of rules of the level the user is playing. The predefined criteria may be embodied in these per-level rules, or may be generic to multiple levels. The game logic will have access to data for each tile including its tile ID designating its location on the grid 80, and associated tile data providing information about the contents of that tile, e.g. the game element within that tile, at least one characteristic associated with the game element within the tile, or the tile background appearance. The game logic 2504 will thus be able to determine the game elements to be removed from those respective tiles for each user selection.

The game logic also controls the rules for grouping and placing the rearranged game elements of the sort region 602 on the gameboard, and for determining if the sort region 602 is valid.

The grid can be considered as a map which may be used to determining the relative positions of tiles on the game board from the tile ID. In embodiments of the present invention, the grid 80 is implemented as a two-dimensional grid. By splitting the grid 80 into row or column sets of tiles, each with their own deterministic game element generating algorithm, the game board may be simplified to a set of one-dimensional sub-grids. The grid 80 is shown with two dimensions, x and y. However, any alpha numerical designation can be used as the tile ID. No logical relationship between tile IDs is required. However, the grid position relationship between tile IDs may be determinable from the tile ID alone, e.g. by using an array of tiles with numbered rows and lettered columns. The position of a game element may be either where the game element is or where the game element is going (e.g. the endpoint of a game element moving due to a refill).

Once a group of matching adjacent blocks has been selected by the user, these blocks may be removed, and the respective tiles will become empty. At this stage, a refill of the empty tiles is required based on the refill mechanism 2506. The refill mechanism 2506 may also have conditions on which it relies. For example, other moves or actions taking place on the gameboard may have to be completed before the refill mechanism can take place.

Each tile of the grid 80 may be associated with data to indicate a status, such as filled or unfilled (empty) in relation to game elements. Thus, when the game board is refilled, each tile of the grid may be checked for such a status. Upon determining that there are tiles which are empty, the need to refill these tiles is recognised. Boolean logic may be used to determine whether a tile is to be refilled using the filled status of the tiles of the grid. The tiles must satisfy the condition of being unfilled in order to be refilled. As part of the refill mechanism, empty tiles are designated as the endpoint for particular blocks. This may be as the endpoint of a block which is already in the game board and moving as a result of a game move due to the action of the physics engine 2508, or as the endpoint of a new block entering the game board. The physics engine component 2508 is configured to control the movement of moving game elements in the display. It may control the movement of both the game elements and the tile characteristics. The physics engine 2508 may be part of the game logic 2504.

Although in the embodiments described above the sorting booster is implemented in a 'clicker' game, it will be appreciated that the sorting booster may be implemented in a 'linker' game. In such a game, the sorting booster may be more beneficial to the user if the sort region is larger, such that more game elements on the gameboard are sorted. With a larger sort region, a longer chain may be able to be formed by the user since more game elements have been sorted. This may result in the user being awarded more points.

It will be appreciated that, whilst specific embodiments of the invention have been described, these are not exhaustive. The scope of the invention is not defined by the described embodiment but only by the appendant claims.

The invention claimed is:

1. A computer device comprising:
a user interface controllable to display to a user a gameboard of multiple user selectable game elements of at least two types; and
a processor configured to:
generate a user activatable booster object for display on the user interface;
detect, at the user interface, a first user input of a user selecting the user activatable booster object;
detect, at the user interface, a second user input of the user selecting a first target tile;
define on the gameboard relative to the first target tile a first sort region associated with the user activatable booster object, the first sort region comprising a first group of sortable game elements of at least two types at respective tile locations in the first sort region;
generate on the user interface a first visual indication of the first group of game elements in the first sort region which visually distinguishes the game elements in the first group from the other game elements on the gameboard;
detect, at the user interface, a third user input to select a second target tile to thereby define a second sort region affected by the booster effect at a new location on the gameboard, prior to activating the booster object;
modifying the first visual indication to a second visual indication identifying a second group of sortable game elements of the second sort region;

detect, at the user interface, a fourth user input to activate the booster object;
activate the booster object to generate a booster effect;
wherein the processor is further configured, on activation of the booster object, to generate the booster effect by detecting the group of game elements in the second sort region defined on the gameboard;
without removing the game elements from the second sort region, sort the sortable game elements in the group to place at least some of the sortable game elements of the second sort region at new tile locations in the second sort region in order to display all game elements of the group of a first matching type adjacent one another in the second sort region and all game elements of the group of a second matching type adjacent one another to generate a sorted configuration of the game elements in the second sort region;
the computer device further comprising a memory holding a tile data structure comprising a plurality of element identifiers respectively identifying game elements of the game board, each element identifier indicating a tile location of the game elements and a sortability property of the game elements wherein the processor is configured to update the sortability property of each game element based on the location of the first and second sort regions.

2. The computer device according to claim 1, wherein the gameboard is an array of m×n game elements arranged in rows and columns, and the group of game elements is an p×q array, where p≤m, q≤n.

3. The computer device according to claim 1, wherein the processor is configured to detect selection by the user of one of the user-selectable game elements which is adjacent at least one other user selectable game element of a matching type and to remove the selected game elements and all other user selectable adjacent game elements of the matching type.

4. The computer device according to claim 1, wherein the processor is configured to detect if the group in the region contains at least two game elements of a matching type.

5. The computer device according to claim 1, wherein the processor is configured to identify a largest group of game elements of the first type in the region and sort into a first location in the sort region, then identify a next largest number of the second type and sort into a second location.

6. The computer device according to claim 1, wherein the processor is configured to identify the first type of which there are at least two game elements in the sort region and sort the at least two game elements of the first type into a first location, then identify the second type of which there are at least two game elements and sort the at least two game elements of the second type into a second location.

7. The computer device according to claim 5, wherein the processor is configured to determine for the sorted configuration whether the sorted game elements in at least one of the first and second locations are adjacent at least one game element of the first and second type, respectively, outside the region.

8. The computer device according to claim 1, wherein the visual indication is at least one of:
a coloured border of the region;
a highlighting of the game elements in the group;
a darkening of game elements in the gameboard which are not in the group;
enlargement of game elements in the group; and
a visual depiction of displacement of game elements in the group out of the plane of the gameboard.

9. The computer device according to claim 1, wherein the visual indication is indicative of whether the group contains at least two game elements of a matching type.

10. The computer device according to claim 1, wherein the processor is configured to detect the user input to activate the booster object by detecting at least one of:
removal of a user touch on a touch screen of the user interface; and
selection of a control on the user interface.

11. The computer device according to claim 1, wherein the processor is configured to present a visual representation of the booster object on the user interface at at least one of:
a selected location within the region of the booster effect; and
a location externally of the gameboard;
wherein the visual representation is responsive to user engagement to activate the booster object.

12. The computer device according to claim 1, wherein each element identifier also indicates a type property of the game element.

13. The computer device according to claim 12, wherein the gameboard comprises a plurality of tiles each supporting a respective game element and each having a tile identifier indicating its tile location in the gameboard, wherein the location of the booster effect is indicated by the tile identifier of a target tile at which the booster object is located.

14. The computer device according to claim 13, wherein the processor is configured to determine the tile identifiers of the tiles in the region, access element identifiers of the elements supported by these tiles, and determine the type of the element to generate at least one list of elements of each matching type in the region to enable sortable game elements of each matching type to be moved to their respective new tile location within the region to generate the sorted configuration.

15. The computer device according to claim 14, wherein the group comprise non-sortable game elements which remain in place on the gameboard.

16. A method of controlling a display of a user device, the method comprising:
displaying on a user interface a gameboard of multiple user-selectable game elements of at least two types;
generating a user activatable booster object for display on the user interface;
detecting, at the user interface, a first user input of a user selecting the user activatable the booster object;
detecting, at the user interface, a second user input of the user selecting a first target tile;
defining on the gameboard relative to the first target tile a first sort region associated with the user activatable booster object, the first sort region comprising a first group of sortable game elements of at least two types at respective tile locations in the first sort region;
generating on the user interface a first visual indication of the first group of game elements in the first sort region which visually distinguishes the game elements in the first group from the other game elements on the gameboard;
detecting, at the user interface, a third user input to select a second target tile to thereby define a second soft region affected by the booster effect at an new location on the gameboard, prior to activating the booster object;
modifying the first visual indication to a second visual indication identifying a second group of sortable game elements of the second sort region;
detecting a fourth user input to activate the booster object;

activating, at the user interface, the booster object to generate a booster effect;

wherein, on activation of the booster object, the booster effect is generated by detecting a group of game elements in the second sort region defined on the gameboard;

without removing the game elements from the second sort region, sorting the sortable game elements in the group to place at least some of the sortable game elements of the second sort region at new tile locations in the second sort region in order to display all game elements of the group of a first matching type adjacent one another in the second sort region and all game elements of the group of a second matching type adjacent one another to generate a sorted configuration of the game element in the second sort region;

the computer device further comprising a memory storing game data including a tile data structure comprising a plurality of element identifiers respectively identifying game elements of the game board, each element identifier indicating a tile location of the game elements and a sortability property of the game elements wherein the processor is configured to update the sortability property of each game element based on the location of the first and second sort regions.

17. A computer program comprising computer readable instructions stored on a non-transitory computer readable media, the computer readable instructions, when executed by a processor of a computer device, causing a method of controlling a graphical user interface of the computer device to be implemented, the method comprising:

displaying on a user interface a gameboard of multiple user-selectable game elements of at least two types;

generating a user activatable booster object for display on the user interface;

detecting, at the user interface, a first user input of a user selecting the user activatable booster object;

detecting, at the user interface, a second user input of the user selecting a first target tile;

defining on the gameboard relative to the first target tile a first sort region associated with the user activatable booster object, the first sort region comprising a first group of sortable game elements of at least two types at respective tile locations in the first sort region;

generating on the user interface a first visual indication of the first group of game elements in the first sort region which visually distinguishes the game elements in the first group from the other game elements on the gameboard;

detecting, at the user interface, a third user input to select a second target tile to thereby define a second sort region affected by the booster effect at a new location on the gameboard, prior to activating the booster object;

modifying the first visual indication to a second visual indication identifying a second group of sortable game elements of the second sort region;

detecting, at the user interface, a fourth user input to activate the booster object;

activating the booster object to generate a booster effect;

wherein, on activation of the booster object, the booster effect is generated by detecting the group of game elements in the second sort region defined on the gameboard;

without removing the game elements from the second sort region, sorting the sortable game elements in the group to place at least some of the sortable game elements of the second sort region at new tile locations in the second sort region in order to display all game elements of the group of a first matching type adjacent one another in the second sort region and all game elements of the group of a second matching type adjacent one another to generate a sorted configuration of the game elements in the second sort region;

the computer device further comprising a memory storing game data including holding a tile data structure comprising a plurality of element identifiers respectively identifying game elements of the game board, each element identifier indicating a tile location of the game elements and a sortabililty property of the game elements wherein the processor is configured to update the sortability property of each game element based on the location of the first and second sort regions.

* * * * *